(12) United States Patent
Belani et al.

(10) Patent No.: US 9,246,936 B1
(45) Date of Patent: *Jan. 26, 2016

(54) PERFORMANCE BENCHMARKING FOR SIMULATED PHISHING ATTACKS

(71) Applicant: PhishMe, Inc., Leesburg, VA (US)

(72) Inventors: Rohyt Belani, New York, NY (US); Aaron Higbee, Leesburg, VA (US); Scott Greaux, Glenmont, NY (US)

(73) Assignee: PhishMe, Inc., Leesburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/630,367

(22) Filed: Feb. 24, 2015

Related U.S. Application Data

(63) Continuation of application No. 13/763,515, filed on Feb. 8, 2013, now Pat. No. 8,966,637.

(51) Int. Cl.
*G06F 11/00* (2006.01)
*H04L 29/06* (2006.01)

(52) U.S. Cl.
CPC ........ *H04L 63/1433* (2013.01); *H04L 63/1483* (2013.01)

(58) Field of Classification Search
CPC .......................... G06F 21/577; H04L 63/1416
USPC ...................................... 726/22–25
See application file for complete search history.

(56) References Cited

U.S. PATENT DOCUMENTS

| | | |
|---|---|---|
| 5,892,903 A | 4/1999 | Klaus |
| 6,954,858 B1 | 10/2005 | Welborn et al. |
| 7,281,031 B1 | 10/2007 | Wang et al. |
| 7,325,252 B2 | 1/2008 | Bunker et al. |
| 7,373,385 B2 | 5/2008 | Prakash |
| 7,457,823 B2 | 11/2008 | Shraim et al. |
| 7,490,356 B2 | 2/2009 | Lieblich et al. |

(Continued)

FOREIGN PATENT DOCUMENTS

| | | |
|---|---|---|
| JP | 2006-285844 A | 10/2006 |
| JP | 2007-323640 A | 12/2007 |

(Continued)

OTHER PUBLICATIONS

Alnajim, Abdullah, et al., "An Anti-Phishing Approach that Uses Training Intervention for Phishing Websites Detection," 2009 Sixth International Conference on Information Technology: New Generations, 2009, DD. 405-410, IEEE, USA.

(Continued)

*Primary Examiner* — Anthony Brown
(74) *Attorney, Agent, or Firm* — CipherLaw

(57) ABSTRACT

Described herein are methods, network devices and machine-readable media for conducting a simulated phishing attack on a first group of individuals, and performing an analysis of the group's performance to the simulated attack. In the analysis, an aggregate performance of the first group is compared with an aggregate performance of individuals from a second group. Standardizing the simulated phishing attacks for individuals from both the first and second groups is necessary in order for the performance of the first group to be fairly or meaningfully compared to the performance of the second group. To ensure uniformity in the simulated phishing attacks, messages thereof may be constructed from template messages, the template messages having placeholders for individual-specific and company-specific information.

30 Claims, 8 Drawing Sheets

(56) References Cited

U.S. PATENT DOCUMENTS

| | | | |
|---|---|---|---|
| 7,509,675 B2 | 3/2009 | Aaron | |
| 7,603,709 B2 | 10/2009 | Lewis et al. | |
| 7,617,532 B1 | 11/2009 | Alexander et al. | |
| 7,634,810 B2 | 12/2009 | Goodman et al. | |
| 7,668,921 B2 | 2/2010 | Proux et al. | |
| 7,681,234 B2 | 3/2010 | Florencio et al. | |
| 7,685,631 B1 | 3/2010 | Paya et al. | |
| 7,788,723 B2 | 8/2010 | Huddleston | |
| 7,841,003 B1 | 11/2010 | Emdee | |
| 7,865,958 B2 | 1/2011 | Lieblich et al. | |
| 7,904,518 B2 | 3/2011 | Marino et al. | |
| 7,925,883 B2 | 4/2011 | Florencio et al. | |
| 7,971,246 B1 | 6/2011 | Emigh et al. | |
| 7,987,495 B2 | 7/2011 | Maler et al. | |
| 8,181,232 B2 | 5/2012 | Grandcolas et al. | |
| 8,191,148 B2 | 5/2012 | Oliver et al. | |
| 8,209,381 B2 | 6/2012 | Sinn et al. | |
| 8,220,047 B1 | 7/2012 | Soghoian et al. | |
| 8,271,007 B2 | 9/2012 | Cai et al. | |
| 8,286,249 B2 | 10/2012 | Adelstein et al. | |
| 8,291,065 B2 | 10/2012 | Goodman et al. | |
| 8,296,376 B2 | 10/2012 | Goldberg et al. | |
| 8,321,934 B1 | 11/2012 | Cooley et al. | |
| 8,332,918 B2 | 12/2012 | Vedula et al. | |
| 8,365,246 B2 | 1/2013 | Readshaw | |
| 8,381,293 B2 | 2/2013 | Emigh et al. | |
| 8,407,798 B1 | 3/2013 | Lotem et al. | |
| 8,423,483 B2 | 4/2013 | Sadeh-Koniecpol et al. | |
| 8,438,642 B2 | 5/2013 | Feng et al. | |
| 8,464,346 B2 | 6/2013 | Barai et al. | |
| 8,464,352 B2 | 6/2013 | Toomey | |
| 8,468,244 B2 | 6/2013 | Redlich et al. | |
| 8,484,741 B1 | 7/2013 | Chapman | |
| 8,615,807 B1 | 12/2013 | Higbee et al. | |
| 8,635,703 B1 | 1/2014 | Belani et al. | |
| 8,719,940 B1 | 5/2014 | Higbee et al. | |
| 8,910,287 B1 | 12/2014 | Belani et al. | |
| 8,966,637 B2 | 2/2015 | Belani et al. | |
| 2002/0091940 A1 | 7/2002 | Welborn et al. | |
| 2005/0132225 A1 | 6/2005 | Gearhart | |
| 2005/0183143 A1 | 8/2005 | Anderholm et al. | |
| 2006/0075504 A1 | 4/2006 | Liu | |
| 2006/0123464 A1 | 6/2006 | Goodman et al. | |
| 2006/0168066 A1 | 7/2006 | Helsper et al. | |
| 2006/0174119 A1 | 8/2006 | Xu | |
| 2006/0271631 A1 | 11/2006 | Qureshi et al. | |
| 2007/0107053 A1 | 5/2007 | Shraim et al. | |
| 2007/0136806 A1 | 6/2007 | Berman | |
| 2007/0192855 A1 | 8/2007 | Hulten et al. | |
| 2007/0245422 A1 | 10/2007 | Hwang et al. | |
| 2007/0250618 A1 | 10/2007 | Hammond | |
| 2007/0294352 A1 | 12/2007 | Shraim et al. | |
| 2008/0037791 A1 | 2/2008 | Jakobsson | |
| 2008/0047017 A1 | 2/2008 | Renaud | |
| 2008/0052359 A1 | 2/2008 | Golan et al. | |
| 2008/0141342 A1 | 6/2008 | Curnyn | |
| 2008/0271124 A1 | 10/2008 | Nisbet et al. | |
| 2008/0288303 A1 | 11/2008 | Gray et al. | |
| 2008/0288330 A1 | 11/2008 | Hildebrand et al. | |
| 2009/0013041 A1 | 1/2009 | Farmer et al. | |
| 2009/0089859 A1 | 4/2009 | Cook et al. | |
| 2009/0144308 A1 | 6/2009 | Huie et al. | |
| 2009/0172772 A1 | 7/2009 | Souille | |
| 2009/0241168 A1 | 9/2009 | Readshaw | |
| 2009/0241173 A1 | 9/2009 | Troyansky | |
| 2009/0259725 A1 | 10/2009 | Rabinovich | |
| 2009/0265430 A1 | 10/2009 | Bechtel et al. | |
| 2009/0282112 A1 | 11/2009 | Prakash | |
| 2009/0319647 A1 | 12/2009 | White et al. | |
| 2009/0320137 A1 | 12/2009 | White et al. | |
| 2009/0328208 A1 | 12/2009 | Peters | |
| 2010/0017616 A1 | 1/2010 | Nichols et al. | |
| 2010/0043071 A1 | 2/2010 | Wang | |
| 2010/0125911 A1 | 5/2010 | Bhaskaran | |
| 2010/0138925 A1 | 6/2010 | Barai et al. | |
| 2010/0154055 A1 | 6/2010 | Hansen | |
| 2010/0211641 A1 | 8/2010 | Yih et al. | |
| 2010/0235918 A1 | 9/2010 | Mizrahi et al. | |
| 2010/0281536 A1 | 11/2010 | Richards et al. | |
| 2010/0299292 A1 | 11/2010 | Collazo | |
| 2010/0313266 A1 | 12/2010 | Feng et al. | |
| 2011/0030059 A1 | 2/2011 | Greenwald | |
| 2011/0055922 A1 | 3/2011 | Cohen et al. | |
| 2011/0061089 A1 | 3/2011 | O'Sullivan et al. | |
| 2011/0072262 A1 | 3/2011 | Amir et al. | |
| 2011/0078795 A1 | 3/2011 | Liu | |
| 2011/0093546 A1 | 4/2011 | Rubingh | |
| 2011/0184877 A1 | 7/2011 | McHugh et al. | |
| 2011/0225652 A1* | 9/2011 | Emigh et al. | 726/22 |
| 2011/0238855 A1 | 9/2011 | Korsunsky et al. | |
| 2012/0096553 A1 | 4/2012 | Srivastava et al. | |
| 2012/0124671 A1* | 5/2012 | Fritzson et al. | 726/26 |
| 2012/0174235 A1 | 7/2012 | Hamilton, II et al. | |
| 2012/0258437 A1 | 10/2012 | Sadeh-Koniecpol et al. | |
| 2012/0311669 A1 | 12/2012 | Akase | |
| 2012/0311703 A1 | 12/2012 | Yanovsky et al. | |
| 2012/0324576 A1 | 12/2012 | Clark et al. | |
| 2013/0018972 A1 | 1/2013 | Sargent et al. | |
| 2013/0031627 A1 | 1/2013 | Wang et al. | |
| 2013/0198846 A1 | 8/2013 | Chapman | |
| 2013/0203023 A1 | 8/2013 | Sadeh-Koniecpol et al. | |
| 2013/0268470 A1 | 10/2013 | Yablokov et al. | |

FOREIGN PATENT DOCUMENTS

| | | |
|---|---|---|
| WO | 2011/017196 A2 | 2/2011 |
| WO | 2012/068255 A2 | 5/2012 |

OTHER PUBLICATIONS

Toolan, Fergus, et al., "Feature Selection for Spam and Phishing Detection," 2010 eCrime Researchers Summit, 2010, pp. 1-12, IEEE, USA.

Fette, Ian, et al., "Learning to Detect Phishing Emails," Carnegie Mellon Cyber Laboratory Technical Report CMU-CYLAB-06-012, Jun. 2006, pp. 1-12, Carnegie Mellon University, PA, USA.

Soni, Pravin, et al., "A Phishing Analysis of Web Based Systems," ICCCS'11 Feb. 12-14, 2011, Rourke/a, Odisha, India, 2011, pp. 527-530, ACM, USA.

Alnajim, A., et al., "An Approach to the Implementation of the Anti-Phishing Tool for Phishing Websites Detection," International Conference on Intelligent Networking and Collaborative Systems, 2009, p. 105-112, IEEE, USA.

He, Mingxing, et al., "An Efficient phishing webpage detector," Expert Systems with Applications, 2011, pp. 12018-12027, vol. 38, Elsevier Ltd., UK.

Zhang, Yue, et al., "CANTINA: A Content-Based Approach to Detecting Phishing Web Sites," Proceedings of the 16th International Conference on World Wide Web, May 8-12, 2007, Banff, Alberta, Canada, May 2007, pp. 639-648, ACM, USA.

Wenyin, Liu, et al., "Detection of Phishing Webpages based on Visual Similarity," 14th International Conference on World Wide Web, May 10-14, 2005, Chiba, Japan, DD. 1060-1061, ACM, USA.

Parno, Bryan, et al., "Phoolproof Phishing Prevention," CyLab Carnegie Mellon University, Dec. 3, 2005, 16 pages, Carnegie Mellon University, PA, USA.

Dhamija, Rachna, et al., "The Battle Against Phishing: Dynamic Security Skins," Symposium on Usable Privacy and Security (SOUPS) 2005, Jul. 6-8, 2005, Pittsburgh, PA, USA, 12 pages.

Huang, Chun-Ying, et al., "Using one-time passwords to prevent password phishing attacks," Journal of Network and Computer Applications, 2011, DD. 1-10, Elsevier B.V., NL.

Jackson, Collin, et al., "An Evaluation of Extended Validation and Picture-in-Picture Phishing Attacks," Financial Cryptography and Data Security, 2007, 13 pages, Springer-Verlag, DE.

Kang, Le, et al., "CAPTCHA Phishing: A Practical Attack on Human Interaction Proofing," Inscrypt 2009, LNCS 6151, 2010, pp. 411-425, Springer-Verlag, DE.

Dazeley, Richard, et al, "Consensus Clustering and Supervised Classification for Profiling Phishing Emails in Internet Commerce Security," PKAW 2010, LNAI 6232, 2010, pp. 235-246, Springer-Verlag, DE.

(56) References Cited

OTHER PUBLICATIONS

Jakobsson, Markus, "Modeling and Preventing Phishing Attacks," FC'05 Proceedings of the 9th international conference on Financial Cryptography and Data Security, 2005, pp. 1-19.
Dhamija, Rachna, et al., "Why Phishing Works," Proceeding ofCHI-2006: Conference on Human Factors in Computing Systems, Apr. 2006, 10 pages.
Wu, Min, et al., "Do Security Toolbars Actually Prevent Phishing Attacks?," CHI 2006, Apr. 22-27, 2006, Montreal, Quebec, Canada, 2006, 10 pages, ACM, USA.
Zhang, Yue, et al., "Phinding Phish: Evaluating Anti-Phishing Tools," Proceedings of the 14th Annual Network and Distributed System Security Symposium (NOSS 2007), 2007, 16 pages.
Egelman, Serge, et al., "You've Been Warned: An Empirical Study of the Effectiveness of Web Browser Phishing Warnings," CHI 2008, Apr. 5-10, 2008, Florence, Italy, 2008, 10 pages, ACM, USA.
Downs, Julie, et al., "Decision Strategies and Susceptibility to Phishing," Symposium on Usable Privacy and Security (SOUPS), Jul. 12-14, 2006, Pittsburgh, PA, USA, 2006, 12 pages.
Wright, Ryan, et al., "The Influence of Experiential and Dispositional Factors in Phishing: An Empirical Investigation of the Deceived," Journal of Management Information Systems, Summer 2010, IPP. 273-303, vol. 27, No. 1, M.E. Sharpe, Inc., USA.
Sheng, Steve, et al., "Who Falls for Phish? A Demographic Analysis of Phishing Susceptibility and Effectiveness of Interventions," CHI 2010, Apr. 10-15, 2010, Atlanta, Georgia, USA, 2010, 10 pages, ACM, USA.
Vishwanath, Arun, et al., "Why do people get phished? Testing individual difference in phishing vulnerability within an integrated, information processing model," Decision Support Systems, 2011, IDD. 576-586, vol. 51, Elsevier B.V., NL.
Alnajim, Abdullah, et al., "An Evaluation of Users' Anti-Phishing Knowledge Retention," 2009 International Conference on Information Management and Engineering, 2009, pp. 210-214, IEEE, USA.
Sheng, Steve, et al., "Anti-Phishing Phil: The Design and Evaluation of a Game That Teaches People Not to Fall for Phish," Symposium on Usable Privacy and Security (SOUPS) 2007, Jul. 18-20, 2007, Pittsburgh, PA, USA, 2007, 12 pages.
Kumaraguru, Ponnurangam, et al., "Protecting People from Phishing: The Design and Evaluation of an Embedded Training Email System," Proceeding of the SIGCHI Conference on Human Factors in Computing Systems, Apr. 2007, pp. 1-10, ACM, USA.
Blom, Elma, et al., "Dummy auxiliaries in child and adult second language acquisition of Dutch," Lingua, 2011, pp. 906-919, vol. 121, Elsevier B.V., NL.
Radford, Andrew, et al., "On the Acquisition of Universal and Parameterised Goal Accessibility Constraints by Japanese Learners of English," Essex Research Reports in Linguistics, Mar. 2011, 46 pages (cover and second page, and DD. 1-44), vol. 60, No. 5, University of Essex, UK.
Dominiguez, Laura, et al., "Testing the Predictions of the Feature Assembly Hypothesis Evidence from the L2 Acquisition of Spanish Aspect Morphology," Proceedings of the Boston University Conference on Language Development, 2011, 14 pages, vol. 35, Cascadilla Press, MA, USA.
Bliton, Daniel, et al., "Unannounced Phishing Exercises and Targeted Training: Results and Lessons Learned," Interservice/Industry Training, Simulation, and Education Conference (11/TSEC), 2011, pp. 1-11, Paper No. 11342, I/ITSEC, USA.
Adams, Elizabeth, et al., "Brief Overview: Mandatory Training—A Systematic Review of Research NPL and Trends in Learning Organizations," Veterans Health Administration Office of Patient Care Services Technology Assessment Program, TAP Brief Overview, Mar. 2010, 23 pages (cover page, pp. i-iii, and pp. 1-19), VA Technology Assessment Program, Boston, MA, USA.
Ferguson, Aaron J., "Fostering E-Mail Security Awareness: The West Point Carronade," Educause Quarterly, 2005, pp. 54-57, vol. 28, No. 1, Educause Online Publication, http://www.educause.edu/eq.

Hidi, Suzanne, et al., "Strategies for increasing text-based interest and students' recall of expository texts," Reading Research Quarterly, Fall 1988, pp. 465-483, XX.111/4, International Reading Association, Delaware, USA.
Klevinsky, T. J., et al., Chapter 3—Penetration for Hire, Hack I. T.—Security Through Penetration Testing, 2002, DD. 25-27, Addison-Wesley Professional, Pearson Education Ltd, USA.
Sadoski, Mark, "Resolving the Effects of Concreteness on Interest, Comprehension, and Learning Important Ideas From Text," Educational Psychology Review, 2001, pp. 263-281, vol. 13, No. 3, Plenum Publishing Corporation, NY, USA.
Simulating malicious emails to educate end users on-demand, Jansson, Kenny; Von Solms, Rossouw, IEEE Symposium on Web Society, p. 74-80, 2011, ISSN: 21586985, E-ISSN: 21586993; ISBN-13: 9781457702112; 2011 3rd Symposium on Web Society, SWS2011, Oct. 26, 2011-Oct. 28, 2011, Institute for ICT Advancement, Nelson Mandela Metropolitan University, Port Elizabeth, South Africa.
School of phish: a real-world evaluation of anti-phishing training, Ponnurangam Kumaraguru; Justin Cranshaw; Alessandro Acquisti; Lorrie Cranor; Jason Hong; Mary Ann Blair; Theodore Pham, Carnegie Mellon University, SOUPS '09 Proceedings of the 5th Symposium on Usable Privacy and Security, Article No. 3, ISBN: 978-1-60558-736-3; doi:10.1145/1572532.1572536, 12 pages.
Design a mobile game for home computer users to prevent from "phishing attacks", Arachchilage, Nalin Asanka Garnagedara; Cole, Melissa, International Conference on Information Society, i-Society 2011, p. 485-489, 2011, ISBN-13: 9780956426383; Article No. 5978543, International Conference on Information Society, i-Society 2011, Jun. 27, 2011-Jun. 29, 2011, School of Information Systems, Computing and Mathematics, Brunel University, Uxbridge, Middlesex, United Kingdom.
Kumaraguru et al., "Lessons From a Real World Evaluation of Anti-Phishing Training", 14 pages.
Robertson, "Amid the VIPERS Establishing Malware's Position Within the Information Ecosystem", 54 pages, 2011.
Sheng et al., "Anti-Phishing Phil: The Design and Evaluation of a Game That Teaches People Not to Fall for Phish", 14 pgs, 2007.
Spinapolice, "Mitigating the Risk of Social Engineering Attacks", 67 pgs. 2011.
Trevor, "Stratum Security, Announcing ThreatSim—Stratum's Spear Phishing and Data Exfiltration SaaS Offering", 1 pg, 2013.
Alex Tsow and Markus Jakobsson, "Deceit and Deception: A Large User Study of Phishing", 46 pages, 2007.
Wombat Security Technologies, "Wombat Security Technologies Offers Tips, Training, and Free Simulated Phishing Attacks to Help Companies and their Employees Avoid Holiday Phishing Scams", 3 pages, 2011.
Steve Sheng, Mandy Holbrook, Ponnurangam Kumaraguru, Lorrie Cranor, Julie Downs, "Who Falls for Phish? A Demographic Analysis of Phishing Susceptibility and Effectiveness of Interventions" CHI 2010, Apr. 10-15, 2010, Atlanta, GA, USA, 10 pages.
"Phishme: The Easy Way to Enhance Employee Phishing Awareness", http://www.brighthub.com/computing/enterprise-security/reviews/5298.aspx; accessed Jul. 23, 2013; Jul. 4, 2011, 3 pages.
"What is PhishMe?", http://phishme.com/whatisphishme.html; accessed Jul. 23, 2013; 2 pages.
Aaron Higbee, "Phishme.Com—Techincal Paper", 2009, 10 pages.
Art Fritzson et al, U.S. Appl. No. 61/414,142, filed Nov. 16, 2010, "Phishing Awareness Training (PAT) Distinction Components" 39 pages.
K.Jansson and R. von Solms, "Social Engineering: Towards a Holistic Solution," presented at the South African Information Security Multi-Conference, Port Elizabeth, South Africa, 2010.
"WhiteGold goes fishing for phishing", www.arnnet.com.au/article/299134/whitegold_goes_fishing_phishing/, accessed Jul. 23, 2013, Apr. 14, 2009, 3 pages.
"United States Military Academies to Use PhishMe to Combat Spear Phishing", msmvps.com/blogs/donna/archive/2009/07/24/united-states-military-academies-to-use-phishme-to-combat-spear-phishing.aspx, accessed Jul. 24, 2013, Jul. 24, 2009, 1 pg.
Brian M. Bowen et al., "Measuring the Human Factor of Cyber Security", Department of Computer Science Columbia University, 2011, 6 pages.

(56) References Cited

OTHER PUBLICATIONS

"What is PhishMe?", accessed at http://web.archive.org/web/20111104184530/http://www.phishme.com/what_is_phishme.php on May 9, 2015, 2 pgs., (Nov. 4, 2011).
Jansson, Kenny, "A Model for Cultivating Resistance to Social Engineering Attacks", Dissertation, Sep. 2011, with attachments.
"Anti-phishing training adds attachments to mix", www.networkworld.com/news/2009/090209-anti-phishing-training-adds-attachments-to.html, accessed Sep. 9, 2013, 2009, 3 pages.
"Core Impact penetration tester goes phishing", InfoWorld, Jan. 7, 2008, 2 pages.
"Core Impact 7.5", www.infoworld.com/print/31390, SC Magazine, Aug. 2008, 1 page.
Victor Garza, "Product review: Core Impact penetration tester goes phishing", www.infoworld.com/print/31390, accessed Sep. 9, 2013, 2008, 3 pages.
Markus Jakobsson et al., "Designing Ethical Phishing Experiments: A study of (ROT13) rOnl query features", Indiana University, Bloomington, IN 47406, USA, WWW 2006, May 23-26, 2006, Edinburgh, Scotland, ACM 1595933239/06/0005., 10 pages.
"To defeat phishing, Energy learns to phish", gcn.com/Articles/2011/06/13/DOE-Phishing-Test.aspx?p=1, accessed Sep. 9, 2013, 2011, 3 pages.
"Humans are the Front Line' against Phishing for Intrepidus Group", blog.executivebiz.com/2010/03/humans-are-the-front-line-against-phishing-for-intrepidus-group/, accessed Sep. 9, 2013, 2010, 3 pages.
"InfoSec: 23 percent of users fall for spear phishing", www.scmagazine.com/infosec-23-percent-of-users-fall-for-spear-phishing/article/128480/#, accessed Sep. 9, 2013, 2009, 3 pages.
"Intrepidus Group and BrandProtect Partner to Offer Holistic Anti-Phishing Solution", www.redorbit.com/news/technology/1670312/intrepidus_group_and_brandprotect_partner_to_offer_holistic_antiphishing_solution/, accessed Sep. 9, 2013, 2009, 3 pages.
Ponnurangam Kumaraguru, "PhishGuru: A System for Educating Users about Semantic Attacks", 2009 dissertation, School of Computer Science, Institute for Software Research, Carnegie Mellon University, Pittsburgh, PA 15213, 198 pages.
"Phishing for user security awareness" Dodge, Ronald C.; Carver, Curtis; Ferguson, Aaron J. Computers & Security, vol. 26 (1), Elsevier, Feb. 1, 2007, 8 pages.
"One-Quarter of Worldwide Population at Risk of Spear Phishing Attacks", www.certmag.com/read.php?in=5245, accessed Sep. 9, 2013, 2 pages.
Thomas Claburn, "Phish Your Colleagues With PhishMe", www.informationweek.com/security/client/phish-your-colleagues-with-phishme/209400255, accessed Sep. 9, 2013, Jul. 22, 2008, 2 pages.
K. Jansson and R. von Solms, "Phishing for phishing awareness", 2011-2013, 18 pages.
"Phishme.com Internal Communication", ha.ckers.org/blog/20080306/phishmecom-internal-communication/, accessed Sep. 9, 2013, 5 pages.
Phishme.com, "Introduction to PhishMe.com", Nov. 2010, 15 pages.
K. Jansson and R. von Solms, "Phishing for phishing awareness," Behaviour & Information Technology, pp. 1-10, 2011.
Lori Faith Cranor, "Can Phishing Be Foiled?", Scientific American, Dec. 2008, 7 pages.
"Social Phishing" Tom N. Jagatic, Nathaniel A. Johnson, Markus Jakobsson, Filippo Menczer Communications of the ACM, vol. 50 No. 10, pp. 94-100, Oct. 2007.
"Reduce the risk from targeted phishing and malware attacks. On demand.", Stratum Security, 2011, 2 pages.
"ThreatSim: Executive Summary", Stratum Security, 2011, 6 pages.
K. Jansson and R. von Solms, "Towards a Social Engineering Resistant User Model," presented at 13th Annual Conference on WWW Applications, Johannesburg, South Africa (2011).
"An Empirical Evaluation of PhishGuruTM Embedded Training" Wombat Security Technologies, Apr. 2009, 12 pages.
"What is PhishMe?", Intrepidus Group, 2009, 1 page.
Rohyt Belani, "Spear Phishing Train Your Workforce to Dodge the Hook" 2009, 26 pages.
"Phishme.com Internal Communication", ha.ckers.org web application security lab, Mar. 6, 2008, 5 pgs.
"How PhishMe Works", accessed at http://web.archive.org/web/20111204012721/http://phishme.com/how_phishme_works.php on May 9, 2015, 2 pgs. (Dec. 4, 2011).
Building an encrypted and searchable audit log, 11th Annual Network and Distributed Security Symposium (NDSS '04), Feb. 5-6, 2004.

* cited by examiner

Dear [Employee Name]:

There has been a recent change to the health care benefits at [Company Name]. Please immediately review these changes in the health care benefits information attached.

Thank you,
[Human Resource Representative]
[Human Resource Job Title]
[Human Resource E-mail Address]
[Human Resource Phone Number]
[Company Logo]

Attached:
[Attachment Name.<file extension>]

Fig. 2

Dear Sandra:

There has been a recent change to the health care benefits at TechnologyPlatform. Please immediately review these changes in the health care benefits information attached.

Thank you,
Barbara Hanna
Benefits Administrator
barbara.hanna@techplat.com
111-222-4434

*TechnologyPlatform*™

Attached:
[Health_Care_Benefits_2013_ver2.pdf]

Dear Ryan:

There has been a recent change to the health care benefits at Solnatum. Please immediately review these changes in the health care benefits information attached.

Thank you,
Richard Carpenter
Director of Human Resources
R.Carpenter@solnatum.com
101-202-3030

Solnatum

Attached:
Updated_Benefits_Package_2013.ppt]

PERFORMANCE BENCHMARKING FOR SIMULATED PHISHING ATTACKS

CROSS-REFERENCE TO RELATED APPLICATIONS

This application is a continuation of application Ser. No. 13/763,515, filed Feb. 8, 2013, and is also related to application Ser. No. 13/785,215, filed Mar. 5, 2013, now U.S. Pat. No. 8,635,703, the entire contents of each of which are incorporated herein by reference.

FIELD OF THE INVENTION

The present invention relates to methods, network devices and machine-readable media for performing simulated phishing attacks on individuals, and more specifically relates to standardizing the simulated phishing attacks to allow the performance of one group of individuals to be meaningfully compared to the performance of another group of individuals.

BACKGROUND

In a phishing attack, an individual (e.g., a person, an employee of a company, a user of a computing device) receives a message, commonly in the form of an e-mail or other electronic communication, directing the individual to perform an action, such as opening an e-mail attachment or following (e.g., using a cursor controlled device or touch screen) an embedded link. If such message were from a trusted source (e.g., co-worker, bank, utility company or other well-known and trusted entity), such action night carry little risk. Nevertheless, in a phishing attack, such message is from an attacker (e.g., an individual using a computing device to perform an malicious act on another computer device user) disguised as a trusted source, and an unsuspecting individual, for example, opening an attachment to view a "friend's photograph" might in fact install spyware, a virus, and/or other malware (i.e., malicious computer software) on his/her computer. Similarly, an unsuspecting individual directed to a webpage made to look like an official banking webpage might be deceived into submitting his/her username, password, banking account number, etc. to an attacker.

While there are computer programs designed to detect and block phishing attacks, phishing attacks are constantly being modified by attackers to evade such forms of detection. The present invention addresses some shortcoming of previous attempts to counter phishing attacks.

SUMMARY OF THE INVENTION

The inventors have observed that one effective means to counter phishing attacks is to make individuals more knowledgeable about phishing attacks. In an education process, an individual is subjected to simulated phishing attacks, which are designed to resemble actual phishing attacks. Upon the individual falling prey to a simulated phishing attack, the individual is provided with training to decrease the likelihood that he/she will be deceived by a future simulated and/or real phishing attack.

In one embodiment, a simulated phishing attack may be presented to all employees (or certain employees) of a company. In addition to educating those employees that fall victim to the simulated phishing attack, the performance of the employees may be monitored. Specifically, the response of each employee to the simulated phishing attack may be recorded, and an aggregate performance of the employees may be calculated based on the respective responses. While stand-alone measurements may be informative (e.g., percentage of employees who ignored simulated phishing attack, percentage of employees who reported simulated phishing attack, percentage of employees who performed target action of simulated phishing attack), it is contemplated that companies will also desire to know how their employees performed relative to another company, relative to companies in a certain industry, relative to companies of a certain size, relative to companies located in certain geographic locations or relative to a certain benchmark or other physical or logical aspects of organizations.

In order for such comparisons to be meaningful (i.e., allow for an apples-to-apples comparison), the simulated phishing attack must be standardized across employees, across companies, and/or across companies within a certain industry. In one embodiment, standardized simulated phishing attacks may be generated from a simulated phishing attack template. The simulated phishing attack template may include one or more messages intended to lure an individual into performing a target action of the simulated phishing attack, the one or more messages including placeholders for information specific to an individual and/or company. A standardized simulated phishing attack may be generated by substituting individual-specific and/or company-specific information into each placeholder of the simulated phishing attack template.

In another embodiment, the simulated phishing attack template may not contain any placeholders; in other words, a simulated phishing attack template may not be customized, personalized, or edited in other ways. If the case where a simulated phishing attack is delivered via e-mail, the "From", "Subject", and "Body", of the e-mail could be identical across all recipients of an organization. The only information an organization would need to input would be a recipient group (i.e., contact information of the intended recipients of the simulated phishing attack). On the other hand, an organization may receive a collection of simulated phishing attack templates, and an administrator of the organization may choose to administer simulated phishing attacks based on one or more of the simulated phishing attack templates. Once administered, the organization might be provided with the performance of its individuals, as well as a benchmark performance as a reference point for comparison.

These and further embodiments of the present invention are discussed herein.

BRIEF DESCRIPTION OF THE DRAWINGS

The present invention is illustrated by way of example, and not limitation, in the figures of the accompanying drawings in which:

FIG. 2 depicts a simulated phishing attack template with placeholders, according to one embodiment;

DETAILED DESCRIPTION OF THE INVENTION

Figure 1:
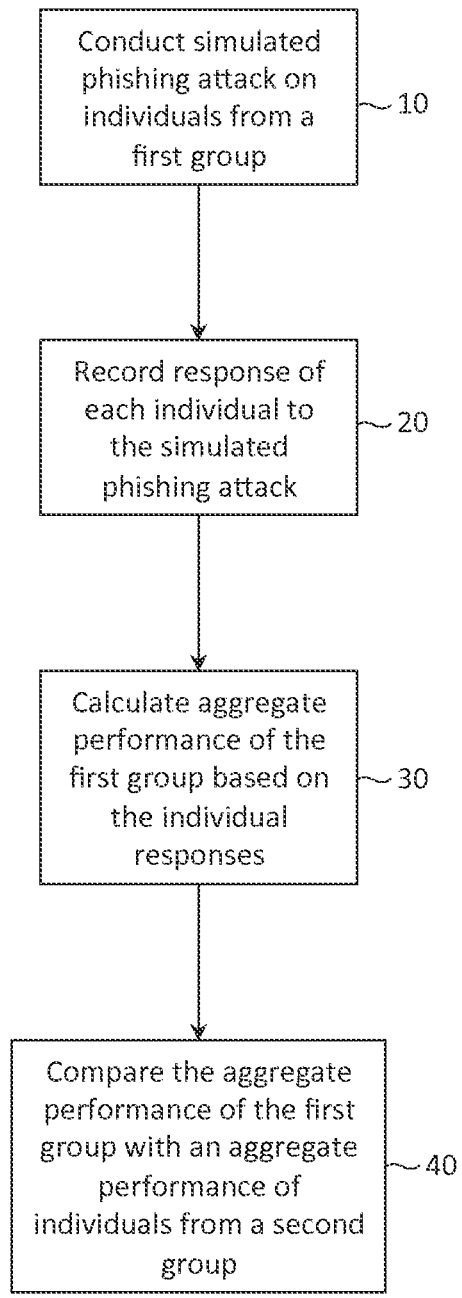
FIG. 1 depicts a flow diagram of a process to conduct a simulated phishing attack on individuals of a first group and analyze the performance thereof, according to one embodiment.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The inventors have realized one effective means to counter phishing attacks is by launching simulated phishing attacks on individuals. Then, upon individuals falling prey to the simulated phishing attacks, training is immediately provided to the individuals to reduce the likelihood that they fall victim to future simulated and/or real phishing attacks. The training might describe the mechanisms used by an attacker to masquerade as a trusted source (e.g., using official company logos, recalling a fictitious, yet plausible encounter with the individual, etc.), and further might describe the possible consequences of a phishing attack (e.g., installation of malware, identity theft, etc.) Such simulated phishing attacks and subsequent training might be particularly well suited for employees of a company, where real phishing attacks can cause considerable harm (e.g., financial harm, loss of privacy, etc.) to the company, its employees and/or its customers. The responses of individuals (e.g., simulated phishing attack was ignored; simulated phishing attack was reported; and target action of simulated phishing attack was performed) is collected in order to measure and analyze the overall performance of a group of individuals to simulated phishing attacks.

A focus of the present application is to construct the simulated phishing attacks and/or categorize the individuals in a way that allows the aggregate performance of one group of individuals to the simulated phishing attacks to be meaningfully compared to the aggregate performance of another group of individuals. In one embodiment, simulated phishing attacks are constructed from one common template, such that all individuals receive simulated phishing attacks that are substantively and/or substantially identical. The common template may contain placeholders for individual-specific and company-specific information. In another embodiment, the common template may contain no placeholders, such that all individuals of an organization receive identical simulated phishing attack(s). In one variation, an organization may receive multiple simulated phishing attack templates, and an administrator of the organization may use one or more of the templates to construct simulated phishing attacks. That is, a first simulated phishing attack may be constructed from a first template and administered to a first group of individuals; a second phishing attack may be constructed from a second template and administered to the first group of individuals, and so on.

Another mechanism to allow a meaningful comparison is to categorize individuals into groups that share certain characteristics such that the aggregate performance may be compared between groups with similar characteristics (e.g., similar in terms of computing device type, field of employment, etc.). For instance, it may not be meaningful to compare the performance of a finance company to the performance of a technology company, because employees thereof handle different types of data (e.g., retirement accounts vs. circuit diagrams) and therefore may have received different internal training programs to protect information privacy. Instead, it may be more meaningful to compare the performance of a finance company to the performance of a finance company. Of course, the comparison of performance between disparate groups may also be informative, as it may suggest whether a certain factor may or may not be correlated with an individual's performance with simulated phishing attacks. These and other embodiments are more fully described in association with the figures below.

As depicted in FIG. 1, a network device (e.g., a server, web server or other computing device) may conduct (step 10) a simulated phishing attack on individuals from a first group. In the instances where a network device is described to perform an action, it is understood that, more specifically, an application software of the network device may perform the stated action, in connection with a processor of the network device. A simulated phishing attack may involve sending one or more messages in the form of e-mails, text messages, telephone calls, Twitter messages, etc. The messages may be disguised as being sent from a trustworthy or trusted contact of the recipient, and typically attempt to lure the recipient into performing a target action of one or more of the messages. A target action may include one or more of opening an attachment, following an embedded link and providing personal information.

A group may refer to a company, or more generally any organization, including a government, non-profit organization, club, etc. A group may also refer to a specific subset of individuals within a company, such as those in the finance department, information technology (IT) department, legal department, etc. A group may also refer to individuals within a certain industry, such as software, hardware, telecommunications, biomedical devices, pharmaceuticals, etc. A group might also refer to an academic institution such as a school, college, academy, university, etc. In the instance of an academic institution, individuals could be students, teachers, staff, administrators, etc. A group might also include only a single individual.

The network device may continually monitor the respective response of the individuals, and accordingly record (step 20) their responses (if any) for later analysis. Responses may include an individual reporting the simulated phishing attack to his/her IT department as a suspicious electronic communication or an individual performing one or more target actions of a simulated phishing attack. After a certain duration of time (which may be configurable) in which no response is detected from an individual, the network device may record that the individual ignored the simulated phishing attack.

In one embodiment, the monitoring may be performed with the assistance of a script (e.g., JAVASCRIPT™ from Oracle Corporation) executing on the computing device of the individual. Upon the individual performing the target action, the script may send a message from the computing device of the individual to the network device, alerting the network device that the target action has been performed. For instance, an individual attempting to open an attachment might trigger a script to send a message to the network device indicating that the individual has performed the target action (i.e., indicating the individual has attempted to open an attachment). As another example, an individual attempting to input his/her username and password into fields of a webpage disguised as a banking webpage, may likewise trigger a script to send a message to the network device indicating that the individual has performed the target action (i.e., indicating the individual has attempted to submit his/her username and password).

To protect the privacy of the individual, the script, in one embodiment, does not actually send the user name and password combination to the network device, as a real phishing attack might otherwise do. Instead, the script may send a "1" to the network device if a username and password combination is submitted by the individual and "0" otherwise. (The characters of "1" and "0" are exemplary and other characters may instead be used.) In another embodiment, the username is sent to the network device, while the password is not sent, in order to protect the individual's privacy. In another embodiment, both the username and password may be sent to the network device, but certain characters of the username and password may be substituted with asterisks ("*") or other placeholder character, once again to protect the privacy of the individual.

In other embodiments, monitoring whether an individual performs a target action may involve associating a unique token (e.g., unique code, unique identifier) with each message recipient. As described above, some simulated phishing attacks operate by directing an individual to click a URL embedded within the body of a message (e.g., select link with cursor control device, select link via touch-screen interface). Monitoring whether the individual clicks the URL may involve the following steps: For each message recipient (e.g., e-mail recipient) in the simulation, a unique token is generated and placed into the body of the message (e.g., e-mail) as a parameter of a hyperlink URL. If the recipient clicks (or attempts to click) the link embedded in the message (e.g., e-mail), the token is passed from the computing device (e.g., laptop, desktop, IPHONE®, IPAD®) to a network device (e.g., reporting server) that tracks the event with a timestamp. In other words, upon receipt of the token, the network device is alerted that an individual associated with the token has clicked (or has attempted to click) an embedded URL, and additionally may be notified the particular time at which such action of the individual occurred.

Also described above, some simulated phishing attacks operate by directing an individual to open an attached file. Monitoring whether the individual opens the attached file may involve the following steps: For each message recipient (e.g., e-mail recipient) in the simulation, a unique token is generated. Depending on automatic interact callout options a filetype provides, the unique token is placed into a callout message. If the recipient opens (or attempts to open) the attachment in the message (e.g., e-mail), the unique token tied to a callout parameter is passed from a computing device to a network device (e.g., reporting server) that tracks the event with a timestamp. In other words, upon receipt of the token tied to the callout parameter, the network device is alerted that an individual associated with the token has opened (or has attempted to open) an attached file associated with a simulated phishing attack, and additionally may be notified the particular time at which such action of the individual occurred.

If an individual performs one or more target actions of the simulated phishing attack, it is possible for the script to transmit additional information regarding the individual to the network device. For instance, a script may be programmed such that an individual performing a target action (e.g., attempting to open an attachment, submitting username/password) will trigger various characteristics of the computing device of the individual to be sent to the network device. Such characteristics may include the computing device's operating system type (e.g., Microsoft Corporation's WINDOWS VISTA®, Linux, Apple Inc.'s iOS), web browser type (e.g., Microsoft Corporation's INTERNET EXPLORER®, Apple Inc.'s SAFARI®, Google Inc.'s CHROME®), and device type (e.g., IBM'S PC, Apple Inc.'s MACBOOK PRO®, Apple Inc.'s IPHONE®, Apple Inc.'s IPAD®, Microsoft Corporation's SURFACE TABLET®, Samsung's GALAXY TABLET®). Such characteristics may be utilized in the analysis of the individuals' performance data, as further described below.

After a respective response of each individual has been recorded, the network device may calculate (step 30) an aggregate performance of the first group based on the respective responses. The aggregate performance may include one or more of a percentage of individuals who ignored the simulated phishing attack, a percentage of individuals who reported the simulated phishing attack, and a percentage of individuals who performed the target action of the simulated phishing attack.

While the description so far has focused on a single simulated phishing attack being administered to a group of individuals, multiple simulated phishing attacks may be administered to the group of individuals. For instance, different types of simulated phishing attacks may be administered, including a first attack in which the target action involves opening an attachment, a second attack in which the target action involves selecting an embedded link, and a third attack in which the target action involves a webpage where the individual is requested to input his/her username and password. In such instance, an aggregate performance may be computed for each type of simulated phishing attack (e.g., a percentage of the group of individuals who succumbed to attack one, attack two and attack three; or, of those that succumbed to an attack, the percentage that succumbed to attack one, attack two and attack three). In the instance where the first group only includes one individual, computing the aggregate performance may include computing the aggregate performance of that individual over several simulated phishing attacks.

In another embodiment, simulated phishing attacks may be conducted over several days. In such instance, the aggregate performance may include the percentage of individuals who succumbed to one or more phishing attacks on the first day, on the second day, on the third date, etc.

As described above, a network device may also receive characteristics of the computing devices of individuals who performed the target action. As such, the aggregate performance may be calculated for specific collections of individuals. For example, statistics may be computed such as, of the individuals who performed the target action, X, Y and Z percent of the individuals performed the target action on an IPHONE®, IPAD® and desktop, respectively.

In another embodiment, the aggregate performance may be calculated as an average. For instance, five simulated phishing attacks may be administered to each individual of a company in a single day. In this scenario, it might be interesting to compute the average number of attacks for which a target action was performed, per individual. The average number might be, for example, 2.3 attacks per individual. Other measures could also be computed, such as the standard deviation, variance, etc., in the number of attacks per person. Further, a histogram might display the number of individuals who fell victim to 0 attacks, 1 attack, 2 attacks, 3 attacks, 4 attacks and 5 attacks, respectively.

Finally, the network device may compare (step 40) the aggregate performance of the first group with an aggregate performance of individuals from a second group. In one embodiment, the first group may be a first company and the second group may be a second company. In another embodiment, the first group may be a first organization and the second group may be one or more organizations other than the first organization. In yet another embodiment, the first group may be one department of a company and the second group may be another department of the same company.

In the case of performance benchmarking, the first group may be a first company and the second group may be a company known to have good performance. Therefore, a comparison may indicate how far or little the first company differs from the "best firm in the industry" in terms of an ability to combat phishing attacks. If the performance of the first group deviates significantly from the best film, the first group may implement "best practices" (e.g., training programs) of the best firm in order to attain the performance of the best firm. Alternatively, the performance of a company may be compared to the aggregate performance of several companies in the "industry" (i.e., several companies in a similar field of expertise). In another embodiment, the performance of an organization may be compared to the aggregate performance of organizations having a similar size. In yet another embodiment, the performance of an organization may be compared to the aggregate performance of organizations in the same industry vertical.

Usage metrics may also be compared between the first group and the second group, such as the frequency of phishing training simulations, the number of times each simulation type is utilized (e.g., number of times a simulated attack includes the target action of an embedded URL, number of times a simulated attack includes the target action of an attachment, etc.), and/or the average time individuals view educational material (e.g., the viewing time averaged over individuals from each of the groups).

In one embodiment, certain comparisons may be removed or omitted. For instance, a first group may include 10 individuals, whereas a second group may include 1000 individuals. Due to the small number of individuals from the first group, the aggregate performance of the first group may not be reliable (e.g., statistically reliable, etc.), and therefore, a comparison may not be performed in such instances. The decision to omit certain comparisons may automatically be made by the network device, based on a number of individuals, or other factors.

Figure 3:
FIG. 3 depicts a simulated phishing attack constructed from a template by substituting individual-specific and company-specific information into placeholders of the template, according to one embodiment.
Figure 4:
FIG. 4 depicts a simulated phishing attack constructed from a template by substituting individual-specific and company-specific information into placeholders of the template, according to another embodiment.

As previously described, it is important that simulated phishing attacks administered to the individuals from the first group and the individuals from the second group be substantively and/or substantially identical in order for a meaningful and/or valid comparison to be made between the two groups. One technique for ensuring substantively and/or substantially identical simulated phishing attacks is to construct simulated phishing attacks from a common template. FIGS. 2-4 provide examples of such construction from a common template.

FIG. 2 depicts an example template message of a simulated phishing attack. The template message contains certain placeholders for an employee name, a company name, a human resource representative, a human resource job title, a human resource e-mail address, a human resource phone number, a company logo and an attachment name. FIG. 3 depicts a simulated phishing attack constructed from the template message of FIG. 2. In the message depicted in FIG. 3, the recipient of the message is Sandra who works at Technology Platform. The message is disguised to appear as if it were actually sent from Barbara Hanna, although it is in fact sent from a network device conducting a simulated phishing attack. Barbara Hannah's job title, e-mail address and phone number are included so that the message appears to be a legitimate e-mail sent from Barbara. The company logo also helps to disguise the e-mail as a legitimate e-mail from Barbara. The attachment name is a fictitious name "Health_Care_Benefits__2013" made to resemble the name of an attachment the recipient (i..e, Sandra) might expect to receive with such e-mail.

FIG. 4 depicts a simulated phishing attack constructed for a different individual (Ryan) and a different company (Solnatum) than that of FIG. 3. The simulated phishing attacks for FIGS. 3 and 4 are substantively identical (i.e., contain same content), yet at the same time are personalized and/or targeted with individual-specific and company-specific information. The individual-specific information might include the recipient name, Ryan; and the company-specific information might include the sender name, sender job title, sender e-mail address, sender phone number, company name, and company logo. Company-specific information may be duplicated across different recipients. Company-specific information might also include a company address, company project names, company fonts, company font colors, company font size, etc.

The attachment name could be tailored to the recipient, a company, or could be a generic name. It would make sense to use a company-specific attachment name, if, for example, a company uses a specific naming convention for file attachments.

As noted above, in contrast to the embodiments provided in FIGS. 2-4, templates may contain no placeholders. Templates without placeholders may be desirable so that every individual receives exactly the same phishing attack(s), permitting a completely uniform method of evaluating individuals. Templates without placeholders may be desirable in instances where the performance of an individual and/or an organization is compared with a benchmark.

Another technique to standardize simulated phishing attacks is to use a common attack vector across individuals, where an attack vector refers to the means to deliver one or more message of a simulated phishing attack. Example attack vectors include e-mail, text messages, and instant messaging.

Simulated phishing attacks may also be adapted (e.g., in terms of resolution, formatting, etc.) for a specific type of computing device (e.g., IPAD®, IPHONE®), operating system (e.g., iOS, WINDOWS VISTA®), and web browser (e.g., INTERNET EXPLORER®, CHROME®), while at the same time substantively and/or substantially maintaining the content of the simulated attack.

Figure 5:
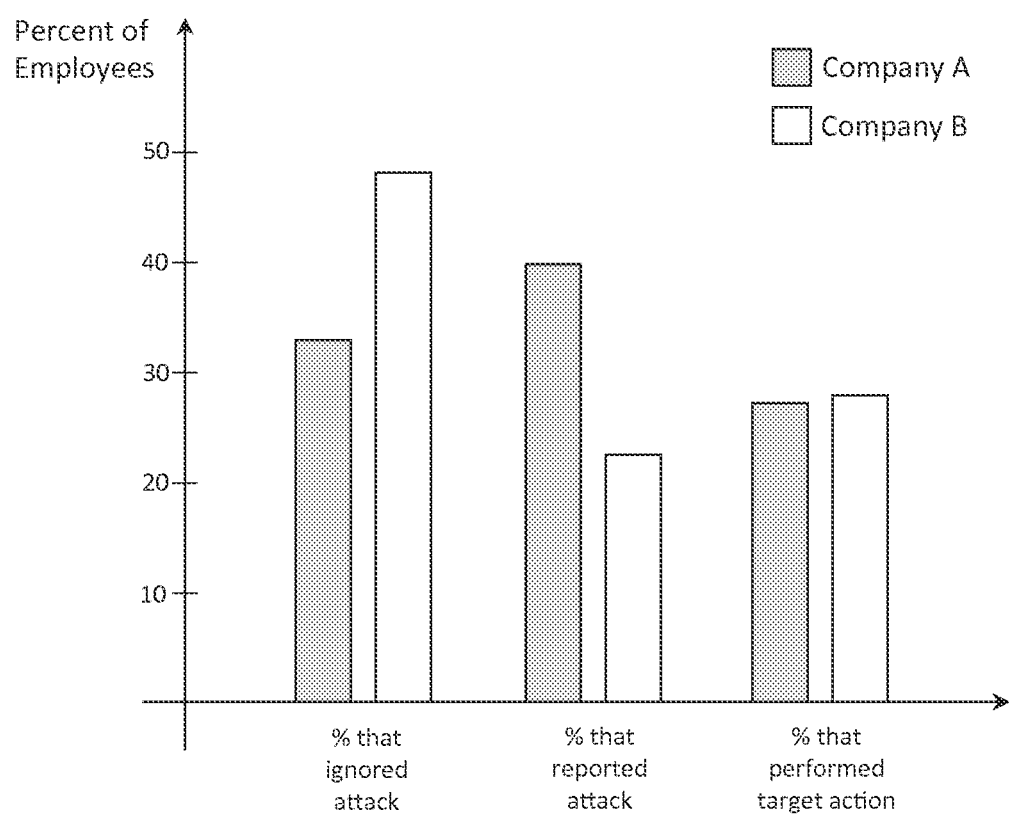
FIG. 5 depicts a comparison of an aggregate performance of a first group to an aggregate performance of a second group, according to one embodiment.

FIG. 5 depicts an example comparison between an aggregate performance of a first group (e.g., Company A) and an aggregate performance of a second group (e.g., Company B) in association with a standardized simulated phishing attack administered to individuals of both groups. As shown in FIG. 5, approximately 33% of employees from Company A ignored a simulated phishing attack, as compared to 49% of employees from Company B; approximately 40% of employees from Company A reported a simulated phishing attack, as compared to 23% of employees from Company B; and approximately 27% of employees from Company A performed the target action of a simulated phishing attack, as compared to 28% of employees from Company B. From such comparison, it can be observed that individuals of Company A are more proactive in reporting suspicious communication than individuals of Company B, and perhaps allow an administrator at Company A to conclude that a campaign at Company A encouraging individuals to report suspicious communication is being warmly received.

Figure 6:
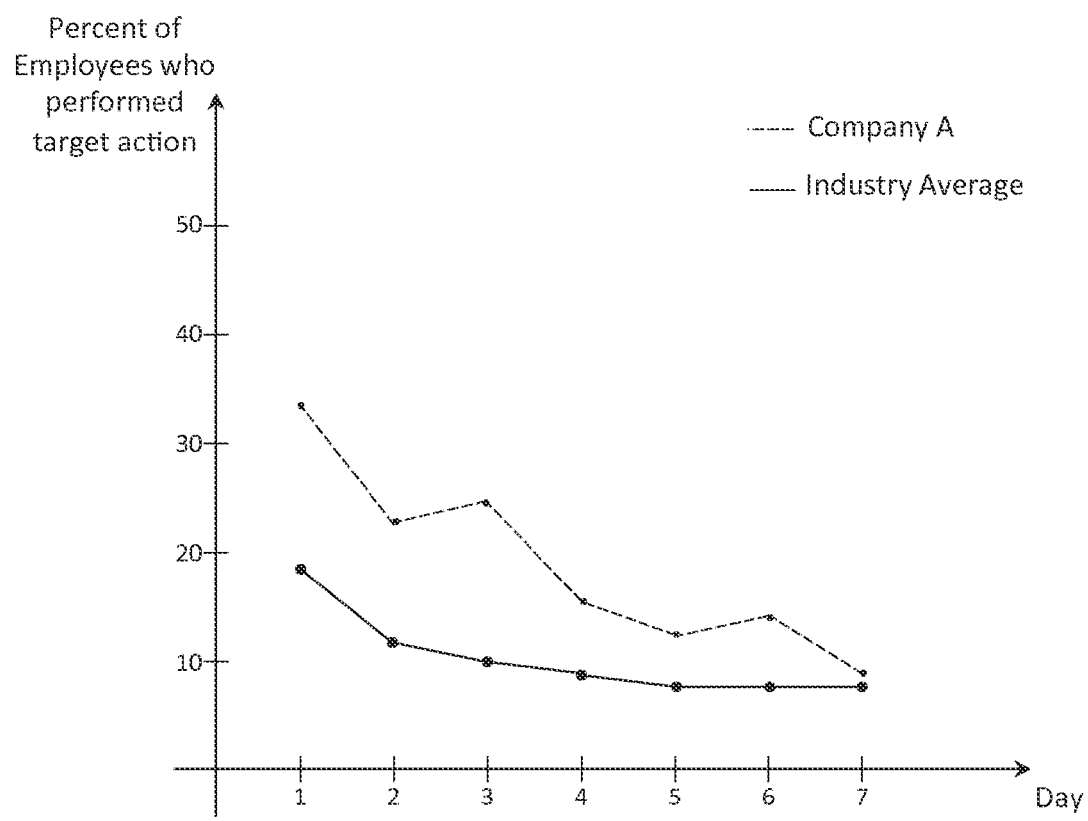
FIG. 6 depicts a comparison of an aggregate performance of a first group to an aggregate performance of a second group, according to another embodiment.

FIG. 6 depicts an example comparison between a temporal trend in the performance of a first group (e.g., Company A) and a temporal trend in the performance of a second group (e.g., industry average). As shown in FIG. 6, there was a gradual decrease (from day 1 to day 7) in the percentage of employees at Company A who performed at least one target action in a day, over the course of a 7 day simulated phishing attack exercise. In the 7 day simulated phishing attack exercise, it might be the case that 10 simulated phishing attacks are administered to each individual on each day. The decreasing trend might indicate that the training administered to individuals is having a positive impact and that individuals are becoming better equipped at recognizing simulated and/or real phishing attacks. Even with such positive results, an employer (or an IT administrator at a company) might wonder whether more training should be administered. Here, a comparison with, for example, the performance of companies in the same industry might help an employer answer such question. In the example of FIG. 6, the average performance for the industry leveled out at about 8%. Therefore, the employer, observing that his/her company's performance decreased to about 9%, might be able to infer that the training accomplished over the 7 day simulated phishing attack exercise is sufficient, and no further training is necessary.

Figure 7:
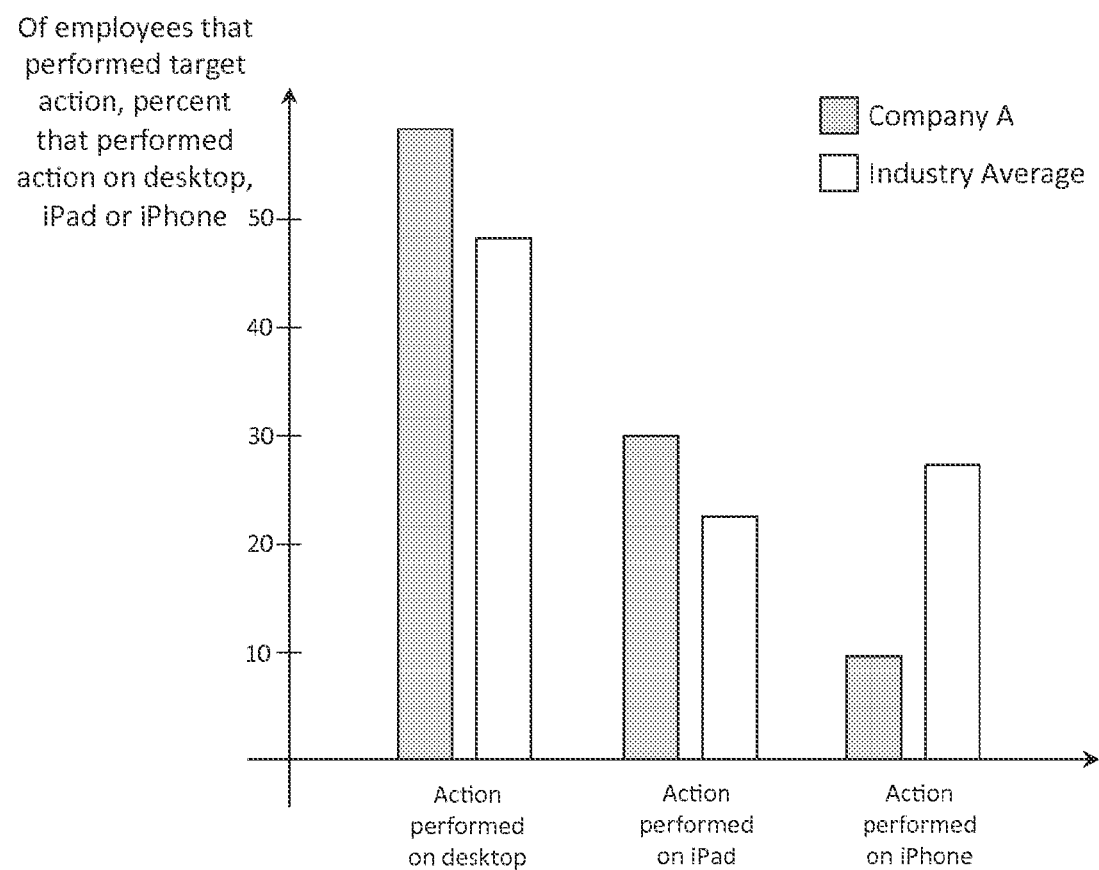
FIG. 7a depicts a comparison of an aggregate performance of a first group to an aggregate performance of a second group, according to another embodiment.

FIG. 7 depicts an example comparison of the aggregate performance of a first group (i.e., Company A) to the aggregate performance of a second group (i.e., industry average), in which the aggregate performance is further displayed according to a type of computing device (e.g., a desktop, IPAD® or IPHONE®) that was used to perform a target action. As depicted in FIG. 7, of the employees that performed a target action at Company A, 58% of individuals performed that target action on a desktop, 30% of individuals performed that target action on an IPAD®, and 12% of individuals performed that target action on an IPHONE®. In contrast, for the industry average, 48% of individuals performed the target action on a desktop, 23% of individuals perform the target action on an IPAD® and 29% of individuals performed the target action on an IPHONE®. Such comparison may inform Company A (or an administrator thereof) that susceptibility for phishing attacks is higher on desktops and IPADs®, as compared to the industry average, and may prompt the employer to provide training specifically targeted to employees using desktops and/or IPADs®. Targeted training might include administering simulated phishing attacks that are tailored to users of desktops and/or IPADs®, and further might include providing training materials (e.g., tutorials, brochures) that are likewise tailored to users of desktops and/or IPADs®.

While not depicted in FIG. 1, the network device may receive input from an administrator or other individual specifying what comparison(s) to perform. For instance, an administrator may specify that his/her company's performance be compared to a benchmark performance, an industry average or the performance of another company. An administrator may further request certain types of comparisons to be generated, such as the comparisons depicted in FIGS. 5-7.

Figure 8:
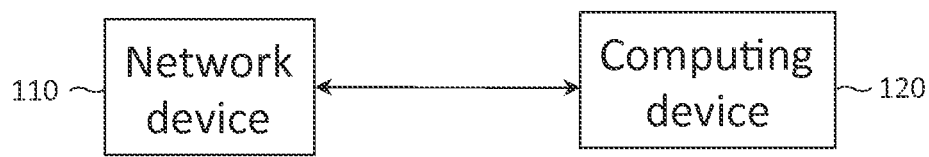
FIG. 8 depicts a system diagram with a network device communicatively coupled to a computing device, according to one embodiment.

FIG. 8 depicts components of a system in accordance with one embodiment. As discussed above, a network device 110 is interfaced with respective computing devices 120 of individuals of a first group (for simplicity, only one computing device has been depicted). In a simulated phishing attack, network device 110 may transmit one or more messages to computing device 120 (e.g., a message attempting to lure an individual operating computing device 120 to perform a target action on computing device 120), and computing device 120 may send a message (e.g., message indicating whether a target action was performed by the individual, a message indicating a type of target action performed, a message indicating a type of device on which the target action was performed) to network device 110 in response to one or more messages of the simulated phishing attack.

Readers should recognize that various embodiments of the present invention may be implemented with the aid of computer-implemented processes or methods (a.k.a. software, programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), JAVA™ and the like. In general, terms such as software, programs, routines, scripts and the like, as used herein, are meant to encompass any series of logical steps performed in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus (referred to above as a network device, computing device, etc.) to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory media suitable for storing electronic instructions, and each coupled to a computer system bus, which in turn may be coupled to a processor.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with any computer system configuration, including personal computers, workstations, hand-held devices, multiprocessor systems, microprocessor-based, digital signal processor-based or other programmable consumer electronics, network computers that employ thin client architectures, minicomputers, mainframe computers, and the like. The invention can also be practiced in distributed computing environments where tasks are performed by remote processing devices that are linked through a communications network.

Thus, methods, network devices and machine-readable media for administering a simulated phishing attack and performing analysis on the results thereof have been described. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
   conducting a first simulated phishing attack on individuals from a first group;
   electronically recording in a computer readable storage medium responses of one or more individuals from the first group to the first simulated phishing attack;
   conducting a second simulated phishing attack on individuals from a second group;
   electronically recording in the computer readable storage medium responses of one or more individuals from the second group to the second simulated phishing attack;
   calculating an aggregate performance of the first group based on the responses to the first simulated phishing attack;
   calculating an aggregate performance of the second group based on the responses to the second simulated phishing attack;
   comparing the aggregate performance of the first group with the aggregate performance of individuals from the second group; and
   generating a representation of the comparison of the aggregate performances for display,
   wherein the simulated phishing attacks are standardized with respect to at least one individual from the first group and at least one individual from the second group so as to allow the aggregate performance of the first group to be compared with the aggregate performance of the second group.

2. The method of claim 1, further comprising determining whether an additional simulated phishing attack should be administered to the individuals from the first group based on the comparing of the aggregate performance of the first group with the aggregate performance of the second group.

3. The method of claim 1, wherein at least one response of the individuals from the first or second groups includes one or more of ignoring the simulated phishing attack, reporting the simulated phishing attack and performing a target action of the simulated phishing attack.

4. The method of claim 1, wherein a target action of the first or second simulated phishing attacks comprises one or more of opening an e-mail attachment, selecting an embedded link, and providing personal information.

5. The method of claim 1, wherein the aggregate performance of the first group is one or more of a percentage of individuals who ignored the simulated phishing attack, a percentage of individuals who reported the simulated phishing attack, and a percentage of individuals who performed a target action of the simulated phishing attack.

6. The method of claim 1, further comprising: in response to individuals from the first and second groups who performed a target action of the simulated phishing attack, receiving information characterizing respective computing devices of those individuals.

7. The method of claim 6, wherein the information characterizing the respective computing devices include one or more of a type of web browser of the computing device, a type of operating system of the computing device, and a type of the computing device.

8. The method of claim 6, further comprising calculating, based on the information characterizing respective computing devices of individuals who performed the target action, an aggregate performance of individuals who share a computing device characteristic.

9. The method of claim 1, wherein the first simulated phishing attack is standardized by preparing one or more messages of the first simulated phishing attack from a template message, wherein the template message includes a placeholder for information specific to the first group.

10. The method of claim 9, wherein the information specific to the first group includes one or more of names of the individuals from the first group, a company logo of the first group, a company name of the first group and one or more project names associated with the first group.

11. The method of claim 1, wherein the first simulated phishing attack is standardized by preparing one or more messages of the first simulated phishing attack from a template message, wherein the template message does not include information specific to the first group.

12. The method of claim 1, wherein the first group is a first company and the second group is a second company.

13. The method of claim 1, wherein the first group is a first organization and the second group includes one or more organizations other than the first organization.

14. The method of claim 1, wherein the first group is a first department within a company and the second group is a second department within the company.

15. The method of claim 1, wherein first group is a first company and the second group is a second company, and wherein the first company and the second company are in the same industry vertical.

16. A system comprising:
   a processor;
   a storage device connected to the processor;
   a network device; and
   a set of instructions on the storage device that, when executed by the processor, cause the processor to:
      conduct a first simulated phishing attack on individuals from a first group;
      electronically record in a computer readable storage medium responses of one or more individuals from the first group to the first simulated phishing attack;
      conduct a second simulated phishing attack on individuals from a second group;
      electronically record in the computer readable storage medium responses of one or more individuals from the second group to the second simulated phishing attack;

calculate an aggregate performance of the first group based on the responses to the first simulated phishing attack;

calculate an aggregate performance of the second group based on the responses to the second simulated phishing attack;

compare the aggregate performance of the first group with the aggregate performance of individuals from the second group; and generate a representation of the comparison of the aggregate performances for display, wherein the simulated phishing attacks are standardized with respect to at least one individual from the first group and at least one individual from the second group so as to allow the aggregate performance of the first group to be compared with the aggregate per of the second group.

17. The system of claim 16, wherein the set of instructions on the storage device further causes the processor to determine whether an additional simulated phishing attack should be administered to the individuals from the first group based on the comparing of the aggregate performance of the first group with the aggregate performance of the second group.

18. The system of claim 16, wherein at least one response of the individuals from the first or second groups includes one or more of ignoring the simulated phishing attack, reporting the simulated phishing attack and performing a target action of the simulated phishing attack.

19. The system of claim 16, wherein the aggregate performance of the first group is one or more of a percentage of individuals who ignored the simulated phishing attack, a percentage of individuals who reported the simulated phishing attack, and a percentage of individuals who performed a target action of the simulated phishing attack.

20. The system of claim 16, wherein the set of instructions on the storage device further causes the processor to, in response to individuals from the first and second groups who performed a target action of the simulated phishing attack, receive information characterizing respective computing devices of those individuals.

21. The system of claim 16, wherein the set of instructions on the storage device further causes the processor to calculate, based on the information characterizing respective computing devices of individuals who performed the target action, an aggregate performance of individuals who share a computing device characteristic.

22. The system of claim 16, wherein the first simulated phishing attack is standardized by preparing one or more messages of the first simulated phishing attack from a template message, wherein the template message includes a placeholder for information specific to the first group.

23. The system of claim 22, wherein the information specific to the first group includes one or more of names of the individuals from the first group, a company logo of the first group, a company name of the first group and one or more project names associated with the first group.

24. The system of claim 16, wherein the first simulated phishing attack is standardized by preparing one or more messages of the first simulated phishing attack from a template message, wherein the template message does not include information specific to the first group.

25. A non-transitory machine-readable storage medium comprising software instructions that, when executed by a processor, cause the processor to:

conduct a first simulated phishing attack on individuals from a first group;

electronically record in a computer readable storage medium responses of one or more individuals from the first group to the first simulated phishing attack;

conduct a second simulated phishing attack on individuals from a second group;

electronically record in the computer readable storage medium responses of one or more individuals from the second group to the second simulated phishing attack;

calculate an aggregate performance of the first group based on the responses to the first simulated phishing attack;

calculate an aggregate performance of the second group based on the responses to the second simulated phishing attack;

compare the aggregate performance of the first group with the aggregate performance of individuals from the second group; and generate a representation of the comparison of the aggregate performances for display, wherein the simulated phishing attacks are standardized with respect to at least one individual from the first group and at least one individual from the second group so as to allow the aggregate performance of the first group to be compared with the aggregate performance of the second group.

26. The non-transitory machine-readable storage medium of claim 25, wherein the first simulated phishing attack is standardized by preparing one or more messages of the first simulated phishing attack from a template message, wherein the template message includes a placeholder for information specific to the first group.

27. The non-transitory machine-readable storage medium of claim 26, wherein the information specific to the first group includes one or more of names of the individuals from the first group, a company logo of the first group, a company name of the first group and one or more project names associated with the first group.

28. The non-transitory machine-readable storage medium of claim 25, wherein the first simulated phishing attack is standardized by preparing one or more messages of the first simulated phishing attack from a template message, wherein the template message does not include information specific to the first group.

29. The non-transitory machine-readable storage medium of claim 25, wherein the set of instructions further causes the processor to determine whether an additional simulated phishing attack should be administered to the individuals from the first group based on the comparing of the aggregate performance of the first group with the aggregate performance of the second group.

30. The non-transitory machine-readable storage medium of claim 25, wherein at least one response of the individuals from the first or second groups includes one or more of ignoring the simulated phishing attack, reporting the simulated phishing attack and performing a target action of the simulated phishing attack.

* * * * *